United States Patent [19]
Thompson et al.

[11] 3,801,281
[45] Apr. 2, 1974

[54] CRITICAL CARBONATE MINERALS IN GEOCHEMICAL PROSPECTING

[75] Inventors: Robert R. Thompson; Robert W. Duschatko, both of Tulsa; Arthur J. Nash, Cushing, all of Okla.

[73] Assignee: Amoco Production Company, Tulsa, Okla.

[22] Filed: Dec. 10, 1971

[21] Appl. No.: 206,813

[52] U.S. Cl. ............................ 23/230 EP, 23/232 R
[51] Int. Cl. ........................................... G01n 33/24
[58] Field of Search ........ 23/230 EP, 232 R, 232 E; 73/19, 153; 166/250

[56] References Cited
UNITED STATES PATENTS
2,165,440   7/1939   Bays.................................. 23/232 R
2,270,299   1/1942   Horvitz............................. 23/232 R OTHER PUBLICATIONS
Peterson et al., Quantitative Determination of Calcite and Dolomite in Pure Carbonates and Limestones, Jour. of Soil Science, Vol. 17, No. 2, p. 317–327 (Sept. 1966).

*Primary Examiner*—Joseph Scovronek
*Attorney, Agent, or Firm*—Newell Pottorf; Paul F. Hawley

[57] ABSTRACT

In a geochemical prospecting method, samples are analyzed for a critical carbonate mineral which contains most of the hydrocarbons in the sample. The mineral is almost always dolomite, calcium-magnesium carbonate, but may be other carbonate minerals, such as iron carbonate, or even calcium carbonate. The critical carbonate should be separated from any other carbonates which are present in significant amounts. Gases are then released from the critical carbonate. Released gases are analyzed for hydrocarbon content. Preferably, gases are released by acid treatment. These gases are then analyzed for carbon dioxide content as a measure of the carbonate mineral. The ratio of hydrocarbons per unit of critical mineral is then plotted to form a geochemical prospecting map.

6 Claims, 2 Drawing Figures

CRITICAL CARBONATE MINERALS IN GEOCHEMICAL PROSPECTING

In geochemical prospecting methods, soil samples are obtained and analyzed for hydrocarbon gas content. The concentration may then be expressed in terms of parts of hydrocarbon gas per unit weight of sample. It has long been recognized that this expression of concentration gives erratic results. It has also been proposed that the erratic results are due to lithologic differences between samples.

Various methods have been devised by other workers in an attempt to overcome the problem. These include methods based on correcting the raw data according to the "sorptive power" of soil samples, as suggested in U.S. Pat. No. 2,165,440 Bays, correcting in terms of total acid soluble minerals as proposed in Canadian Pat. No. 723,550 Debnam, correcting for surface area as described in U.S. Pat. No. 3,120,428 McDermott, and according to gross lithologic differences as disclosed in French Pat. No. 1,448,079.

Even results corrected by the previously proposed methods usually give results which are erratic to an undesirable degree. Therefore, an object of this invention is to provide a correction technique which will give less erratic results. Still other objects will be apparent from the following description and claims.

SUMMARY OF THE INVENTION

We have found that a very high percentage of hydrocarbons is present in a single type of carbonate mineral. This is almost always dolomite, calcium magnesium carbonate. Therefore, in order to avoid erratic results, samples must be analyzed for this mineral and the hydrocarbon concentration calculated with respect to this specific mineral rather than with respect to total sample weight, or even total carbonates.

Figure 1:
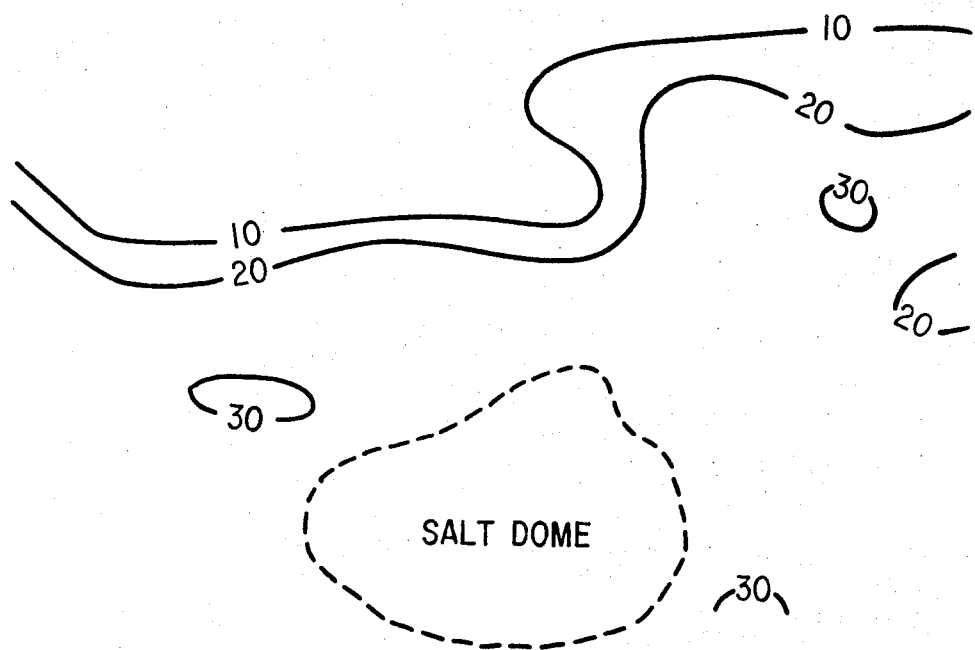
FIG. 1 shows a geochemical prospecting map of an area near the Gulf of Mexico coast. This map was plotted using values calculated on the basis of parts of the sum of ethane, propane and butane per billion parts of total sample.

FIG. 1 shows only a general change from very low values in the north part to higher values covering a broad trend in the south part. The highest values (30 to 33 ppb) are considerably lower than the anomalous values (100 to 1,000 or more parts per billion) usually measured over oil or gas reservoirs in the area. This and the fact that the higher values cover such a broad area around the salt dome prospect made it uncertain whether a true anomaly was present or only a background change.

When our method was applied to this prospect, it was found that the bulk of the hydrocarbon gases in the samples was contained in dolomite. The map shown in FIG. 2 was then prepared showing the sum of concentrations of the three light hydrocarbons, ethane, propane and butane in terms of the dolomite in each sample. In this case, the values over the dome and its flanks (3,000 to 4,000 ppb) are in the range of concentrations of hydrocarbons in dolomite over known petroleum reservoirs in this area. This "dolomite-corrected" map shows that there is definitely a soil-gas anomaly associated with the salt dome, and that the north flank has the strongest anomaly of the portions of the dome covered by the survey.

Figure 2:
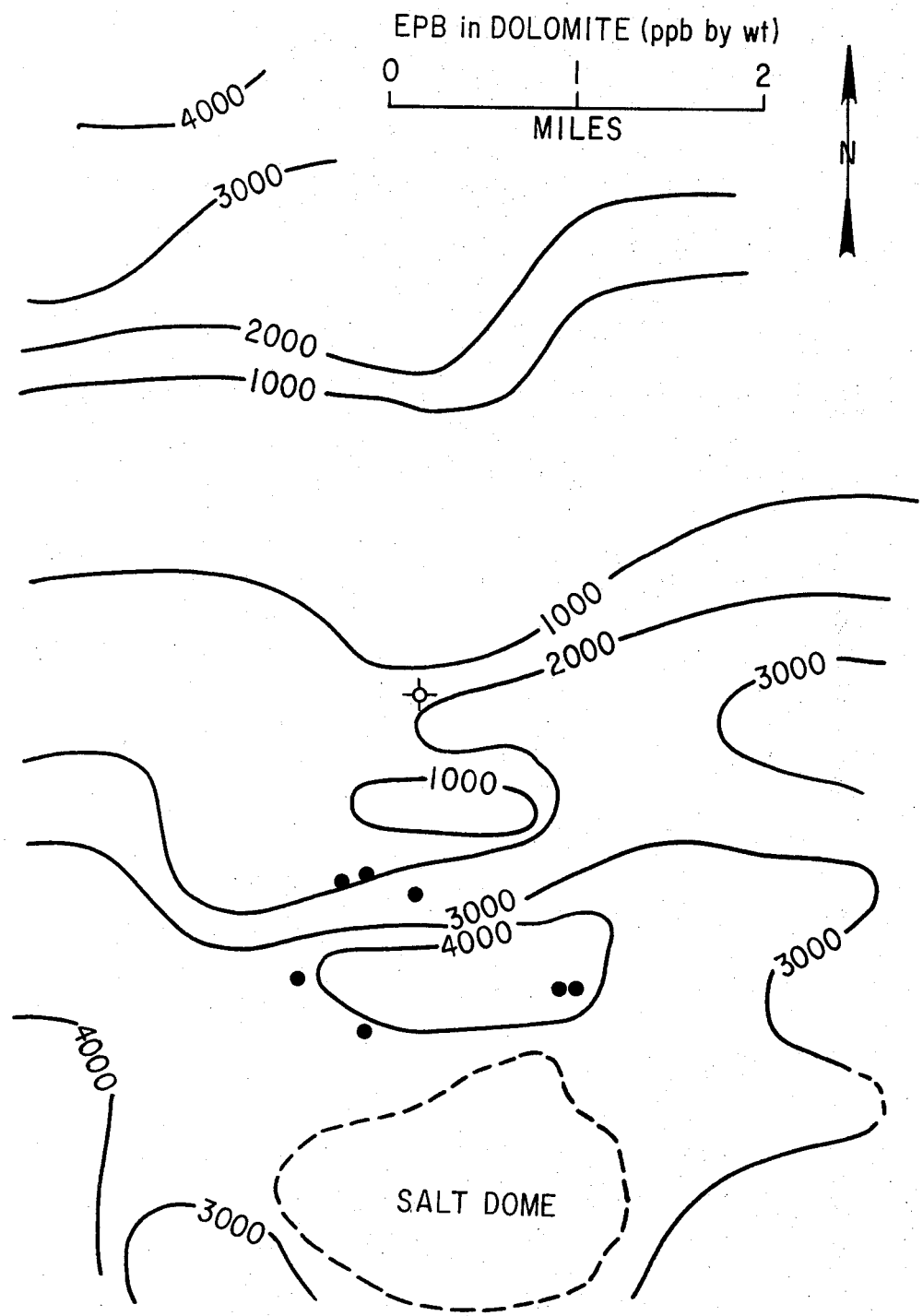
FIG. 2 shows another geochemical prospecting map of the same area. This map was plotted using values calculated on the basis of parts of the same hydrocarbon gases per billion parts of dolomite.

Since the survey was run, the wells shown by dots on FIG. 2 have been drilled resulting in the discovery of a major oil field.

FIG. 2 also shows an anomaly in the northwest corner of the area covered. FIG. 1 gives no indication whatever of this anomaly.

An anomaly is also shown in the southwest corner of FIG. 2. This appears to be associated with a salt dome just outside the area covered. This dome, also undrilled at the time of the survey, has since developed into a prolific oil field.

The map shown in FIG. 2 is the result of data obtained using ethylene diamine tetraacetic acid (EDTA) to separate calcite from dolomite. This step was necessary in the analysis for dolomite content. As explained later, it also avoids an error by removing any hydrocarbons held by the calcite. The method was much like that described in "Method of Solution of Calcareous Materials Using the Complexing Agent, EDTA," by Everett D. Glover, *Journal of Sedimentary Petrology*, Volume 31 (1961), pages 622–626. In the article, EDTA is referred to as "ethylene diamine dinitrilo tetracetic acid" but is actually the same EDTA currently more commonly called simply ethylene diamine tetraacetic acid.

At the present time, we prefer a process using citric acid as the separating solvent. Our process is a slight modification of the process described in "Quantitative Determination of Calcite and Dolomite in Pure Carbonates and Limestones," by G. W. Petersen et al., *Journal of Soil Science*, Volume 17 (1966), pages 317–327. In this method, the calcite and dolomite were separated, the hydrocarbon content of each fraction being measured. Using this technique, the results shown in Tables I and II were obtained.

The samples reported in Table I were taken in a small area off the shore of Louisiana. This group was selected for presentation since the analyses illustrate clearly the wide difference in concentration of hydrocarbons held by the two minerals. EPB stands for ethane, propane and butane. In the table, the methane and EPB content

TABLE I

| Sample | Dolomite % | Calcite % | PPB HYDROCARBONS, Screened Sample Basis | | | | PPB Hydrocarbons, Methane | | Fraction Basis EPB | |
|---|---|---|---|---|---|---|---|---|---|---|
| | | | Dolomite | | Calcite | | | | | |
| | | | Methane | EPB | Methane | EPB | Dolomite | Calcite | Dolomite | Calcite |
| 1 | 1.4 | 9.5 | 191 | 45 | 81 | 19 | 13,600 | 853 | 3,210 | 200 |
| 2 | 1.5 | 6.0 | 286 | 72 | 87 | 20 | 19,100 | 1,450 | 4,800 | 333 |
| 3 | 1.2 | 5.3 | 276 | 66 | 75 | 15 | 23,000 | 1,420 | 5,500 | 284 |
| 4 | 1.4 | 7.2 | 238 | 82 | 94 | 22 | 17,000 | 1,300 | 5,850 | 306 |
| 5 | 1.5 | 4.9 | 404 | 107 | 93 | 27 | 26,900 | 1,900 | 7,140 | 551 | of the dolomite and of the calcite are first presented on the basis of the portion of the total sample passing through a No. 230 U.S. standard sieve, the concentrations being corrected to a dry basis. The concentrations of methane in the dolomite and calcite are then compared, followed by a comparison between the contents of EPB in dolomite and calcite in the fine fraction of each sample. To obtain the latter values, the concentrations on a screened sample basis were simply divided by the dolomite and calcite concentrations in the sample.

It will be apparent from the data in Table I that the hydrocarbon content of the dolomite is a factor of at least ten greater than the hydrocarbon content of the calcite. Since the calcite concentration frequently greatly exceeded the dolomite concentration in the sample, it will be obvious that basing the analysis on total carbonates rather than on dolomite alone would introduce a great error in the values.

It is possible to analyze the total sample for total methane and EPB content and then correct these values for dolomite concentration. However, this technique includes hydrocarbons which are actually present in other minerals, such as calcite. This, of course, introduces an error. Since the fraction of total hydrocarbons present in other minerals is usually small compared to those in dolomite, the error generally is not great. It is preferred, however, to eliminate this error by separating the dolomite from other carbonate minerals and then releasing the hydrocarbons present only in the dolomite.

Table II is presented to overcome the somewhat misleading impression from Table I that the hydrocarbon content of dolomite always greatly exceeds that of calcite.

The samples in Table II are from a different area in the same general offshore region as those in Table I, but the number of samples was much greater and some of the concentrations of dolomite and calcite were much lower. Sample 16 is of particular interest in showing that when the total carbonate content of samples is low, so is hydrocarbon content. There are exceptions to this rule, but they seem to be rare. Lower dolomite and calcite concentrations lead to more erratic results. In samples with higher concentrations of dolomite and calcite, the same general rule obviously applies as in Table I; that is, hydrocarbon concentrations in dolomite are much greater than in calcite.

In the results of Tables I and II, dolomite is obviously the critical carbonate mineral. This is almost always the case. There have been a very few cases, however, where other carbonates have appeared to be the critical carbonate. In one case, for example, a sample was found to contain considerable hydrocarbons but X-ray diffraction indicated the sample contained very little dolomite. The X-ray diffraction also showed the sample contained considerable siderite (iron carbonate). Particles in the 4-to-63 micron range were isolated by a combination of screening and elutriation. A heavy liquid-density separation technique was used to separate dolomite and siderite fractions. The dolomite fraction contained only about 7,700 ppb of EPB, while the siderite contained about 12,100 ppb of EPB.

In another case, samples were taken on shore in the Texas Gulf Coast area. X-ray diffraction showed at least some samples contained no dolomite or siderite (less than 0.3 percent in the method used), but contained considerable calcite. Results of analysis are given in Table III.

TABLE III

| Sample No. | Mineral Concentrations, % | | | EPB Conc. PPB |
| --- | --- | --- | --- | --- |
| | Calcite | Dolomite | Siderite | |
| 24 | 40 | None | None | 165 |
| 25 | 12 | None | None | 59 |
| 26 | 35 | None | None | 130 |
| 27 | 30 | 2-3 | None | 86 |
| 28 | None | None | None | 2.4 |
| 29 | None | 3-4 | None | 0.5 |

TABLE II

| Sample | Dolomite % | Calcite % | PPB HYDROCARBONS, Screened Sample Basis | | | | PPB Hydrocarbons, Methane | | Fraction Basis EPB | |
| --- | --- | --- | --- | --- | --- | --- | --- | --- | --- | --- |
| | | | Dolomite Methane | EPB | Calcite Methane | EPB | Dolomite | Calcite | Dolomite | Calcite |
| 6 | 2.9 | 0.95 | 1,893 | 382 | 57 | 18 | 65,400 | 6,000 | 13,150 | 1,895 |
| 6 | 2.7 | 1.3 | 1,827 | 365 | 147 | 32 | 67,600 | 11,300 | 13,510 | 2,460 |
| 7 | 2.6 | 0.79 | 1,650 | 348 | 79 | 21 | 63,500 | 10,000 | 13,400 | 2,660 |
| 7 | 2.7 | 0.77 | 1,454 | 319 | 66 | 19 | 53,900 | 8,570 | 11,800 | 2,470 |
| 8 | 0.11 | 0.023 | 23 | 3 | 40 | 10 | 20,900 | 174,000 | 2,720 | 43,500 |
| 9 | 2.1 | 1.3 | 1,198 | 229 | 59 | 11 | 57,000 | 4,540 | 10,900 | 847 |
| 10 | 2.5 | 0.073 | 1,032 | 174 | 3 | 0 | 41,300 | 4,100 | 6,970 | 0 |
| 11 | 2.4 | 0.66 | 537 | 105 | 31 | 8 | 22,400 | 4,700 | 4,380 | 1,210 |
| 12 | 2.9 | 1.4 | 1,439 | 274 | 102 | 23 | 49,600 | 7,290 | 9,450 | 1,640 |
| 13 | 1.9 | 1.6 | 653 | 129 | 49 | 12 | 34,400 | 3,060 | 6,800 | 750 |
| 14 | 0.19 | 0.78 | 72 | 18 | 5 | 1 | 37,900 | 641 | 9,480 | 128 |
| 15 | 0.44 | 1.4 | 179 | 38 | 35 | 9 | 40,700 | 2,500 | 8,640 | 642 |
| 16 | 0.000 | 0.001 | 6 | 1 | 2 | 0 | — | — | — | — |
| 17 | 0.18 | 0.56 | 218 | 45 | 140 | 39 | 121,000 | 25,000 | 25,000 | 6,970 |
| 18 | 2.3 | 1.4 | 1,297 | 235 | 197 | 44 | 56,500 | 14,100 | 10,200 | 3,140 |
| 19 | 0.28 | 1.1 | 59 | 28 | 38 | 88 | 21,100 | 3,450 | 10,000 | 8,000 |
| 20 | 0.76 | 3.1 | 240 | 68 | 19 | 4 | 31,600 | 613 | 8,950 | 129 |
| 21 | 0.63 | 0.31 | 313 | 79 | 47 | 12 | 49,700 | 15,200 | 12,550 | 3,870 |
| 22 | 2.2 | 2.5 | 1,098 | 201 | 41 | 10 | 50,000 | 1,640 | 9,140 | 400 |
| 23 | 0.95 | 0.40 | 269 | 56 | 15 | 3 | 28,300 | 3,750 | 5,900 | 750 |

The EPB concentrations in Table III are based on the fraction of the total sample between 63 and 4 microns in particle size.

A general correlation between calcite and EPB concentrations is obvious. There is no apparent correlation between EPB and dolomite, particularly in samples 29 and 30. From the data in Table III, it would seem that calcite is the critical carbonate mineral in this area.

As previously noted, dolomite is almost always the critical carbonate mineral but there can be exceptions. For this reason, it is usually advisable to make a preliminary analysis of at least some of the sample by some means, such as X-ray diffraction, to determine how much of the various carbonate minerals are present. In a very large majority of cases, the principal carbonate minerals are dolomite and calcite. In this case, the following analytical procedure is preferred.

First, the soil samples are wet-screened using a No. 230 U.S. standard sieve. This removes particles larger than about 63 microns, so the differential solution technique using citric acid will not be too greatly upset by wide differences in particle size. The slurry of small particles is then filtered and a portion of the resulting fiber cake is analyzed for water content.

Next, another portion of the filter cake is placed in a reaction flask with distilled water, the flask is attached to vacuum equipment and immersed in a water bath at about 70° to 80° F. The apparatus is then evacuated after which it is isolated from the vacuum pump.

Citrate buffer solution is then added. This is citric acid solution adjusted to a pH of about 5.85 with ammonium hydroxide. The amount of citrate solution should be at least two or three times that necessary to dissolve the calcite which is present. The reaction is allowed to proceed for about 20 minutes, after which the water bath is replaced by an ice bath. The buffered citrate solution at 70° to 80° F dissolves almost all of the calcite, releasing any calcite contained hydrocarbons and forming carbon dioxide. The solution dissolves only a few percent of the dolomite. The ice bath stops, or drastically decreases, any continued reaction with dolomite. After the flask has cooled for about five minutes, the gases are withdrawn from the apparatus and analyzed for methane, EPB, and carbon dioxide.

The evacuated apparatus is again isolated from the pump and the ice bath is replaced by the water bath. Next, hydrochloric acid is added to the reaction flask and reaction is allowed to proceed for about an hour. This dissolves the dolomite, releasing dolomite contained hydrocarbons and forming carbon dioxide. The water bath is replaced by an ice bath and after about 5 minutes the gases are withdrawn and analyzed for hydrocarbon and carbon dioxide.

The amount of dolomite is calculated from the released carbon dioxide. This permits calculating the concentration of hydrocarbons per unit of dolomite in each sample. These concentrations are then plotted on a map to form the desired geochemical prospecting map.

There are many alternates and variations to this preferred technique. Basically, our process simply requires analyzing a sample for the critical carbonate mineral (almost always dolomite) and for hydrocarbons, so the concentration of hydrocarbons per unit of dolomite in the sample can be calculated and plotted.

Analysis for dolomite can be by chemical means or by other means, such as infrared spectroscopy. See, for example, "The Application of Infrared Absorption Spectroscopy to Carbonate Mineralogy," by R. Chester et al., *Sedimentology*, Volume 9 (1967), No. 1, pages 5–21. Analysis may also be made by X-ray diffraction. See, for example, "Quantitative Mineralogic Analysis of Carbonate Sediments; Comparison of X-ray Diffraction and Electron Probe Microanalyzer Methods," by J. N. Weber, *Journal of Sedimentary Petrology*, Volume 38 (1968), No. 1, pages 232–234.

Analysis for hydrocarbons can be by any of the many techniques previously disclosed, use of a hydrogen flame ionization detector behind a chromatographic column being preferred.

Preferably, the critical carbonate should be separated at least from other carbonates before release of hydrocarbons. This separation can be by differential solution, heavy liquid-density separation, or the like. This permits calculation of the concentration of hydrocarbons held only by the critical carbonate. As previously noted, however, a large majority of the hydrocarbons in the soil sample is usually held by the critical carbonate. Therefore, inclusion of hydrocarbons held by other minerals usually causes only minor errors. For this reason, plotting of total hydrocarbons in a sample per unit of critical carbonate ordinarily produces a useful geochemical prospecting map.

Still other variations and alternates will be apparent to those skilled in the art. Therefore, we do not wish to be limited to the examples described above, but only by the following claims.

We claim:

1. In a process for geochemical prospecting in which soil samples are taken over an area and are analyzed for hydrocarbon content, the improvement comprising analyzing each sample for the content of the critical carbonate mineral which contains a majority of the hydrocarbons present in said sample and plotting a map showing the concentration of at least one hydrocarbon per unit of critical carbonate mineral in each sample.

2. The method of claim 1 in which said critical carbonate mineral is dolomite.

3. The method of claim 1 in which said sample is first screened to eliminate large particles, the concentration of hydrocarbons and critical carbonate mineral in the fine fraction passing through the screen then being determined, the amount of at least one hydrocarbon per unit of critical carbonate mineral in the fine fraction then being plotted to form the geochemical prospecting map.

4. The method of claim 1 in which said critical carbonate mineral is separated from at least other carbonate minerals before hydrocarbons are released from said critical carbonate mineral, the fraction containing said critical carbonate mineral is analyzed for hydrocarbon content and critical mineral content, and the map is plotted showing the concentration of at least one hydrocarbon per unit of critical carbonate mineral in said fraction.

5. The method of claim 4 in which said critical carbonate mineral is dolomite.

6. The method of claim 5 in which said sample is screened to reject large particles, the fine fraction is treated first with controlled pH citrate solution to remove calcite and is then treated with hydrochloric acid to release hydrocarbons held by the dolomite and carbon dioxide in said dolomite, the amount of carbon diodixe then being measured to determine the amount of dolomite in the fine fraction of the sample.

* * * * *